United States Patent
Jreij et al.

(10) Patent No.: US 7,519,167 B2
(45) Date of Patent: Apr. 14, 2009

(54) SYSTEM AND METHOD FOR COMMUNICATING SYSTEM MANAGEMENT INFORMATION DURING NETWORK INTERFACE TEAMING

(75) Inventors: Elie Jreij, Pflugerville, TX (US);
Stephen Cochran, Cedar Park, TX (US);
Ramkrishna Prakash, Austin, TX (US);
Paul W. Vancil, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 888 days.

(21) Appl. No.: 11/058,696

(22) Filed: Feb. 15, 2005

(65) Prior Publication Data

US 2006/0184536 A1 Aug. 17, 2006

(51) Int. Cl.
*H04M 11/00* (2006.01)
(52) U.S. Cl. ............ 379/90.01; 709/224; 709/250
(58) Field of Classification Search ........... 379/90.01, 379/93.01; 707/10; 709/223, 226, 224, 250
See application file for complete search history.

(56) References Cited

U.S. PATENT DOCUMENTS

| | | | |
|---|---|---|---|
| 6,502,203 B2 | 12/2002 | Barron et al. | 714/4 |
| 6,584,432 B1 | 6/2003 | Holzinger et al. | 702/188 |
| 6,845,410 B1 | 1/2005 | Brown et al. | 710/29 |
| 7,421,615 B2 * | 9/2008 | Yang et al. | 714/11 |
| 2005/0281191 A1 * | 12/2005 | McGee et al. | 370/216 |

* cited by examiner

*Primary Examiner*—Stella L Woo
(74) *Attorney, Agent, or Firm*—Hamilton & Terrile, LLP; Robert W. Holland

(57) ABSTRACT

An information handling system receives management information from a network, such as IPMI information, with plural network interface cards of the information handling system in a teaming configuration. Upon detecting management information, a network interface card issues an SMBus alert to a management processor of the information handling system. A team module running on the management processor reads the status of the network interfaces to identify the network interface associated with the alert and reads the management information from the network interface. Management information sent to the network is sent through a predetermined one of the network interfaces to ensure that, if teaming gets deactivated at the switch, there will not be multiple NICs with the same BMC MAC address transmitting to the switch.

20 Claims, 3 Drawing Sheets

SYSTEM AND METHOD FOR COMMUNICATING SYSTEM MANAGEMENT INFORMATION DURING NETWORK INTERFACE TEAMING

BACKGROUND OF THE INVENTION

1. Field of the Invention

The present invention relates in general to the field of information handling system network communication, and more particularly to a system and method for communicating system management information during network interface teaming.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with each other and with peripherals through networks to communicate or otherwise process information. For instance, network interface cards (NICs) format information for communication over wireline or wireless local area networks (LANs) having a client-server architecture. Typically, multiple clients, each having at least one NIC, interface with a single server having multiple NICs. Often, multiple servers and switches are used in complex networks to manage communication of large amounts of information at rapid speeds. In such networks, NICs are sometimes "teamed" to better share a network's communication with a server information handling system across the teamed NICs. During teaming, a switch interfaced with multiple NICs of the server information handling system switches network traffic across the NICs with a common network address so that the network traffic load is more evenly shared between the NICs. The NICs are shared between the operating system through a PCI or other internal bus. Network communication is often less efficient without the use of teaming since congestion at a NIC may occur while other NICs are underutilized, resulting in delays of processing information from the congested NIC by the processor of the information handling system server.

One goal of network design is to have server information handling systems that are as robust as feasible in order to avoid network outages. A problem considered in the design of robust server information handling systems is that such systems are often placed in less accessible locations, such as data centers, that make the servicing and repair of server information handling systems more difficult. To address this problem, server information handling systems are often built with a separate management processor, such as a BMC or a RAC, which is able to manage physical components even when the server information handling system central processing unit (CPU) is not operating. For instance, a BMC communicates with the cooling system to monitor environmental conditions and with the BIOS to restart the system, such as in case of a CPU hangup. Remote access to the management processor is typically supported through a single NIC to allow a remote client to send commands to the management processor over the network, such as with the Intelligent Platform Management Interface (IPMI) standard, and through a secondary bus of the information handling system, such as a SMBus. However, when NIC teaming is used, traffic to the management processor is often lost since the switch divides traffic between the NICs so that IPMI traffic can go to a NIC that is not interfaced with the management processor by the secondary bus. To avoid the loss of IPMI management traffic, users are usually warned that teaming and IPMI communication are not compatible so that the user may disable teaming before sending IPMI information.

SUMMARY OF THE INVENTION

Therefore a need has arisen for a system and method which provides communication of management information to a server information handling system during network interface teaming.

In accordance with the present invention, a system and method are provided which substantially reduce the disadvantages and problems associated with previous methods and systems for communication of management information to a server information handling system. Management information received by network interfaces in a teamed configuration results in an alert issued by the receiving network interface to a management processor. The management processor reads the status of the teamed network interfaces to locate and read the management information to perform management tasks associated with the management information.

More specifically, a team module operating on a management processor, such as a BMC, monitors for an alert signal from any of plural teaming network interface cards. A network interface that receives management information issues an alert, such as a SMBus alert, to the management processor. The team module reads the status of the teamed network interfaces to locate the network interface associated with the alert and then reads the management information for use by the management processor. A remote management module that sends the management information to a network address of the network interface team is thus able to provide the management information to the management processor even though the management information may arrive at any of the network interfaces of the team. The team module directs outbound management information sent from the management processor to the remote management module through a predetermined of the network interfaces. Thus, if teaming gets deactivated at the switch, there will not be multiple NICs with the same BMC MAC address transmitting to the switch. This way, the BMC does not even have to track whether teaming is active or not at the switch.

The present invention provides a number of important technical advantages. One example of an important technical advantage is that management information, such as IPMI information, is communicated to a server information handling system during NIC teaming. Thus, network administrators do not have to choose between management and teaming modes of the server in order to remotely manage the server or face the potential complexity of configuring the sever in such modes. Firmware modifications within NICs and management controllers, such as a BMC, reduce or eliminate manual configuration of the server to achieve simultaneous teaming and communication of management information. The reception of management information through plural NICs abstracted in a low level driver of firmware allows the management controller to deal with a single virtual NIC. With management information received by plural NICs, communication of management information is provided more rapidly and accurately by the use of hardware and buffers of the combined NIC resources.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Management information is remotely communicated with an information handling system through network interfaces in a teaming configuration by accepting the management information at any of the teamed network interfaces and sending the management information from a predetermined of the network interfaces. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
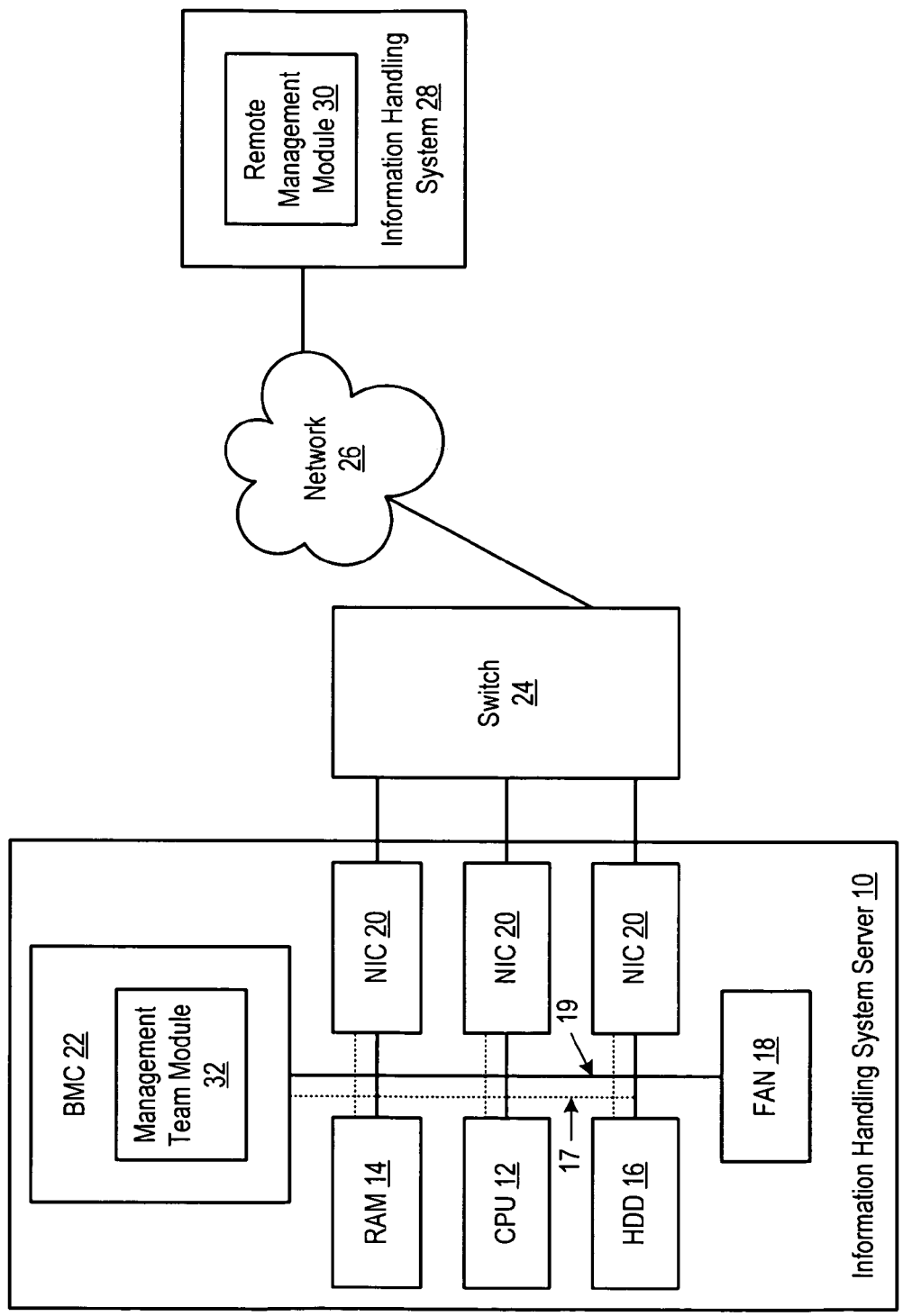
FIG. 1 depicts a block diagram of an information handling system supporting remote management through network interfaces in a teaming configuration.

Referring now to FIG. 1, a block diagram depicts an information handling system supporting remote management through network interfaces in a teaming configuration. Information handling system server 10 processes information with a CPU 12 that communicates the information with other components, such as RAM 14 and hard disc drive ("HDD") 16, through a primary bus 17, such as a PCI bus. Primary bus 17 also interfaces with plural network interface cards 20 that support communication of information between CPU 12 and one or more networks. The physical components of information handling system server 10 are managed by a BMC 22 or other type of management processor through a secondary bus 19, such as a SMBus. For instance, BMC 22 manages the operations of the components used to process information, such as CPU 12, RAM 14, HDD 16 and NICs 20, as well as other physical components, such as a fan 18 used to maintain desired environmental conditions. Remote access to BMC 22 is available through a network 26 by a remote information handling system 28 having a remote management module 30. For instance, IPMI management information sent from module 30 through network 26 can direct BMC 22 to take a variety of management actions, such as resetting a component or flashing firmware of a component. Information handling system 28 sends the management information through network 26 and a switch 24 to a predetermined network address associated with one of the NICs 20 for forwarding to BMC 22 through secondary bus 19.

Information handling system server 10 interfaces with network 26 through switch 24 by placing NICs 20 in a teaming configuration. While the teaming configuration is selected, switch 24 distributes information from network 26 to the NICs 20 to share the network traffic load across all of the NICs 20 rather than to direct traffic to specific NICs 20 based on the traffic's network address. While NICs 20 operate in the teaming configuration, management information from remote management module 30 is randomly distributed across NICs 20 in the same manner as non-management traffic. A management team module 32 operating on BMC 22 detects the receipt of management information at a NIC 20, such as IPMI traffic, and retrieves the management information for processing by BMC 22. NICs 20 pass IPMI traffic to BMC 22 through a "side band" connection of the management bus based on filters for the BMC MAC and IP addresses. Management team module 32 is, for instance, a set of firmware instructions operating on BMC 22 having communication with each of NICs 20 through management bus 19. Management team module 32 coordinates the communication of management information from BMC 22 to network 26 by directing outbound traffic through a predetermined one of the NICs 20. Thus, a remote management module 30 that sends management information to a particular network address may have that management information distributed across the teamed NICs 20 instead of being sent to the NIC 20 associated with the address. However, management information returned to remote management module will come from the expected network address with management team module 32 directing the outbound traffic through the NIC 20 having the network address expected by remote management module 30. In this way, if NIC teaming is deactivated, multiple NICs with the same BMC MAC address will not transmit to the switch and the BMC need not track whether or not teaming is enabled.

Figure 2:
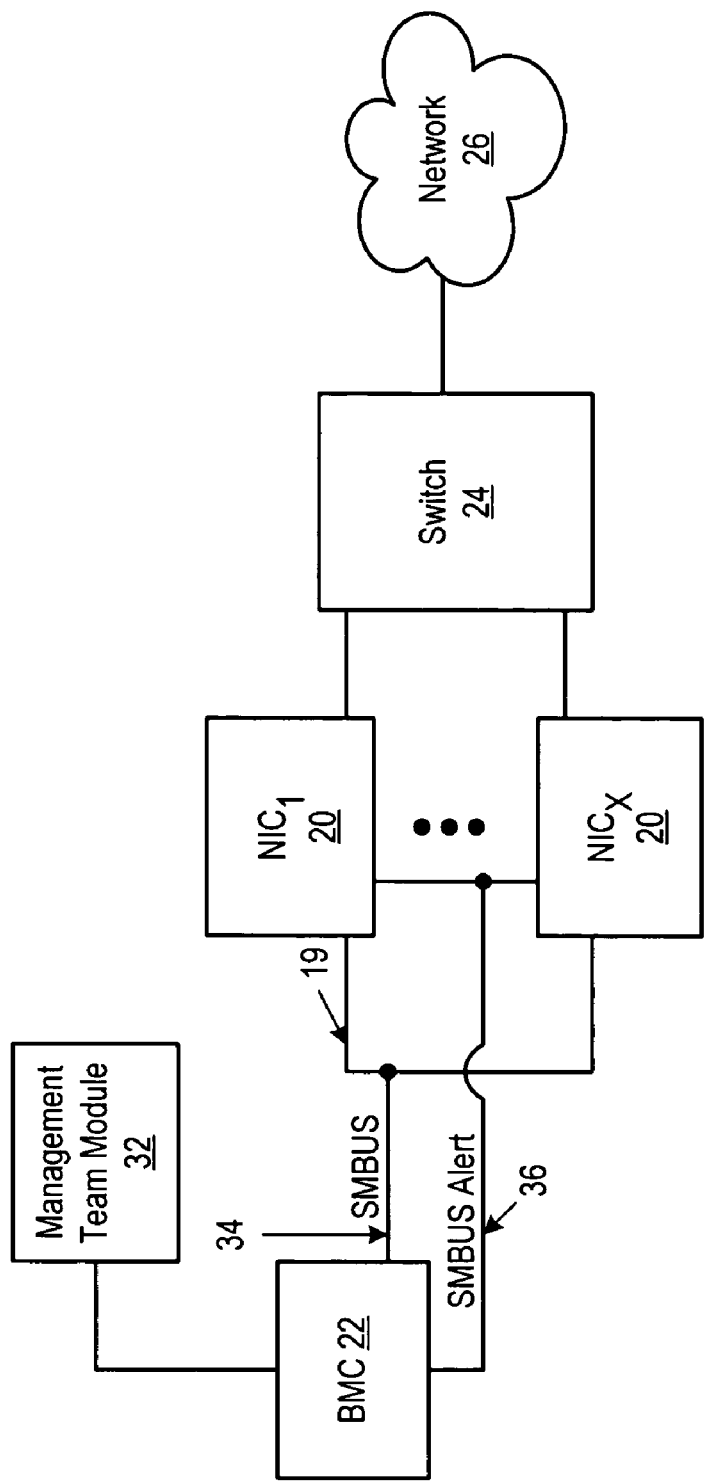
FIG. 2 depicts a block diagram of a system for communicating management information through network interfaces in a teaming configuration.

Referring now to FIG. 2, a block diagram depicts a system for communicating management information through network interfaces in a teaming configuration. Management bus 19 is a SMBus having a communication channel 34 and an alert channel 36. Upon receipt of management information at a NIC 20 from network 26 through switch 24, the NIC 20 issues an alert signal on the SMBus alert channel 36 to BMC 22. For instance, as depicted by FIG. 2, each NIC 20 has a SMBus alert output ORed into a single GPIO of BMC 22. Alternatively, each NIC 20 has a SMBus alert channel connected to a GPIO of BMC 22. Management team module 32 responds to an alert on SMBus alert channel 36 by reading the status of each NIC 20 to determine which NIC 20 received management information traffic and then by reading the management information for use by BMC 22. BMC 22 processes the management traffic and, in the event that a response is generated, management team module 32 directs the response to a primary NIC 20 so that the responses will be sent from a predetermined network address associated with that NIC 20. The use of a single NIC 20 to send outbound management information allows BMC 22 to send outbound traffic without having to monitor whether the NICs are in a teaming configuration since only one NIC will send traffic to the switch with the BMC MAC address.

Figure 3:
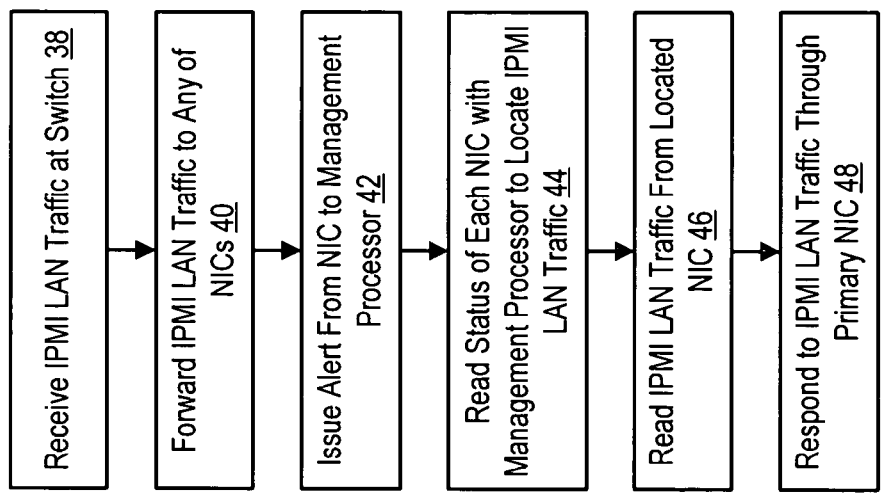
FIG. 3 depicts a flow diagram of a process for communicating management information through network interfaces in a teaming configuration.

Referring now to FIG. 3, a flow diagram depicts a process for communicating management information through network interfaces in a teaming configuration. The process begins at step 38 with the receipt of IPMI local area network (LAN) traffic at the switch supporting a teaming configuration of NICs. At step 40, in accordance with the teaming configuration, the switch forwards the IPMI LAN traffic to any of the NICs of the team. At step 42, the NIC that receives the IPMI LAN traffic issues an alert to a management processor, such as a SMBus alert to a BMC. At step 44, in response to the alert, the management processor reads the status of each NIC to locate the IPMI traffic and, at step 46, reads the IPMI traffic associated with the alert from the located NIC. At step 48, any response to the IPMI traffic that is generated by the management processor is sent through a predetermined primary NIC to maintain consistency of the network address associated with outbound management information.

Although the present invention has been described in detail, it should be understood that various changes, substitutions and alterations can be made hereto without departing from the spirit and scope of the invention as defined by the appended claims.

What is claimed is:

1. An information handling system comprising:
a central processor operable to process information;
plural network interface cards operable to communicate the information with a network in a team configuration, the plural network interface cards further operable to communicate management information with the network;
a primary bus interfacing the central processor and the plural network interface cards, the primary bus operable to communicate the information with a primary protocol;
a management processor operable to manage components of the information handling system in response to the management information;
a secondary bus interfacing the management processor and the plural network interface cards, the secondary bus operable to communicate the management information with a secondary protocol; and
a management team module associated with the management processor and operable to receive management information from any of the network interface cards in the team configuration.

2. The information handling system of claim 1 wherein the management team module is further operable to send management information to the network through a selected one of the network interface cards.

3. The information handling system of claim 2 wherein the management team module comprises firmware running on the management processor.

4. The information handling system of claim 3 wherein the secondary bus comprises a SMBus.

5. The information handling system of claim 3 wherein the primary bus comprises a PCI bus.

6. The information handling system of claim 1 wherein the management team module is further operable to:
receive an alert that management information has arrived at the information handling system;
query the network interface cards to identify a network interface card associated with the alert; and
read the management information from the identified network interface card.

7. The information handling system of claim 6 wherein the management team module is further operable to send management information to a predetermined one of the plural network interface cards for communication to the network.

8. The information handling system of claim 7 wherein the predetermined one of the plural network interface cards has a predetermined network address.

9. The information handling system of claim 8 further comprising a remote management module operable to communicate with the management processor through the network, the remote management module operable to send the management information to the predetermined network address and read the management information from the predetermined network address.

10. A method for communicating management information with an information handling system management processor and a network, the method comprising:
teaming plural network interfaces to receive information from the network, the information including the management information and non-management information;
communicating the non-management information from the network interfaces to the information handling system processing components;
detecting the management information at one or more of the network interfaces;
communicating to the management processor an alert from the one or more network interfaces having the management information;
querying the network interfaces with the management processor to locate the one or more network interfaces having the management information; and
reading the management information with the management processor from the located network interfaces.

11. The method of claim 10 wherein communicating the non-management information further comprises communicating the non-management information through a PCI bus, and wherein reading the management information further comprises reading the management information through a SMBUS.

12. The method of claim 10 further comprising:
communicating management information from the management processor to a predetermined one of the plural network interfaces; and
communicating the management information from the predetermined one of the plural network interfaces to the network.

13. The method of claim 12 wherein the predetermined one of the plural network interface cards has a predetermined network address.

14. The method of claim 10 wherein the management information comprises IPMI information.

15. The method of claim 14 wherein the management processor comprises a BMC.

16. A system for communicating management information with a network, the system comprising:
plural network interfaces operable to communicate with the network in a teaming configuration;

a management processor operable to manage information handling system resources in response to remote management information received from the network;

a management bus interfacing the plural network interfaces and the management processor, the management bus operable to communicate the management information between the management processor and the plural network interfaces; and a team module running on the management processor and operable to coordinate the communication of management information received at the network interfaces in the teaming configuration through the management bus to the management processor 17. The system of claim 16 wherein the management bus further comprises an alert channel and a communication channel, the network interfaces further operable to issue an alert on the alert channel if management information is detected at a network interface.

18. The system of claim 17 the alert channel comprises an alert output from each network interface ORed into a single input of the management processor.

19. The system of claim 17 wherein the team module coordinates communication by reading the status of the network interfaces at the issue of an alert to determine the network interface having management information.

20. The system of claim 17 wherein the team module is further operable to coordinate communication of management information from the management processor to the network through a predetermined one of the plural network interfaces.

* * * * *